United States Patent
Potter et al.

(10) Patent No.: US 6,832,279 B1
(45) Date of Patent: *Dec. 14, 2004

(54) APPARATUS AND TECHNIQUE FOR MAINTAINING ORDER AMONG REQUESTS DIRECTED TO A SAME ADDRESS ON AN EXTERNAL BUS OF AN INTERMEDIATE NETWORK NODE

(75) Inventors: Kenneth H. Potter, Raleigh, NC (US); Trevor Garner, Apex, NC (US)

(73) Assignee: Cisco Systems, Inc., San Jose, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 09/859,709

(22) Filed: May 17, 2001

(51) Int. Cl.$^7$ ............................................. G06F 13/00
(52) U.S. Cl. ....................................... 710/112; 710/52
(58) Field of Search .................... 710/1, 5, 6, 305–314, 710/100, 112, 36, 39, 52; 709/200; 370/412–414

(56) References Cited

U.S. PATENT DOCUMENTS

| | | | |
|---|---|---|---|
| 5,377,345 A | * 12/1994 | Chang et al. | 711/118 |
| 5,535,340 A | * 7/1996 | Bell et al. | 710/112 |
| 5,870,567 A | * 2/1999 | Hausauer et al. | 710/310 |
| 6,014,721 A | * 1/2000 | Arimilli et al. | 710/315 |
| 6,021,451 A | * 2/2000 | Bell et al. | 710/309 |
| 6,065,088 A | * 5/2000 | Bronson et al. | 710/263 |
| 6,148,359 A | * 11/2000 | Elkhoury et al. | 710/311 |
| 6,205,506 B1 | * 3/2001 | Richardson | 710/310 |
| 6,279,064 B1 | * 8/2001 | Bronson et al. | 710/112 |
| 6,330,645 B1 | 12/2001 | Harriman | |
| 6,385,705 B1 | * 5/2002 | Keller et al. | 711/154 |
| RE37,980 E | * 2/2003 | Elkhoury et al. | 710/310 |

OTHER PUBLICATIONS

U.S. Appl. No. 09/859,707, Potter et al., filed May 17, 2001.

\* cited by examiner

*Primary Examiner*—Xuan M. Thai
(74) *Attorney, Agent, or Firm*—Cesari and McKenna, LLP; A. Sidney Johnston, Esq.

(57) ABSTRACT

An apparatus and technique off-loads responsibility for maintaining order among requests directed to a same address on a split transaction bus from a processor to a split transaction bus controller, thereby increasing the performance of the processor. The present invention comprises an ordering circuit that enables the controller to defer issuing a subsequent (write) request directed to an address on the bus until a previous (read) request directed to the same address completes. By off-loading responsibility for maintaining order among requests from the processor to the controller, the invention enhances performance of the processor since the processor may proceed with program execution without having to stall to ensure such ordering. The ordering circuit maintains ordering in an efficient manner that is transparent to the processor.

26 Claims, 6 Drawing Sheets

APPARATUS AND TECHNIQUE FOR MAINTAINING ORDER AMONG REQUESTS DIRECTED TO A SAME ADDRESS ON AN EXTERNAL BUS OF AN INTERMEDIATE NETWORK NODE

CROSS-REFERENCE TO RELATED APPLICATIONS

The present invention is related to the following co-pending and commonly assigned U.S. patent application Ser. No. 09/859,707 titled, Apparatus and Technique for Maintaining Order Among Requests Issued over an External Bus of an Intermediate Network Node, which was filed on even date herewith and which application is hereby incorporated by reference as though fully set forth herein.

FIELD OF THE INVENTION

This invention relates generally to intermediate nodes of computer networks and, more specifically, to maintaining order among requests issued over an external bus of an intermediate node of a computer network.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

Each node typically comprises a number of basic systems including a processor, a main memory and an input/output (I/O) system. Data is transferred between the main memory, processor and I/O system over a system bus, while data transactions within the I/O system occur over an external bus, such as an I/O bus. Each bus typically consists of either address, data and control lines, with the control lines carrying control signals specifying the direction and type of transfer, or a pair of unidirectional signals for passing bus packets containing address, data and control such as in the case of HyperTransport (HPT) bus. For example, the processor (i.e., a source) may issue a read transaction to request the transfer of data from an addressed location on an I/O device (i.e., a target) coupled to the I/O bus and over the system bus to the processor. The processor then processes the retrieved data in accordance with instructions that may have been obtained from main memory. The processor may thereafter issue a write transaction requesting that the results be stored in, e.g., an addressed location in the main memory.

Some buses operate in an "atomic" manner such that the source is granted exclusive access (i.e., control) to the bus until the transaction is complete. However, an atomic bus may potentially waste bus cycles, particularly when waiting for data in response to, e.g., a read request. In a split transaction bus, on the other hand, the source relinquishes control over the bus once the request is sent and an independent response to the request is subsequently returned to the source. Here, the target acquires control of the bus to return the response to the source. The split transaction bus thus essentially enables a transaction to be divided into at least two transfers: the request and the response.

Devices coupled to the split transaction bus typically include common sets of resources (such as buffers or queues) used to store request and response transfers sent over the bus. It is possible that some of the resources may be consumed by these transfers, thereby causing a deadlock situation on the bus. To obviate such a situation, transactions sent over the bus may be reordered. However, re-ordering of transactions over a split transaction bus may result in inconsistent data accesses that, in turn, may adversely impact performance of the system and node.

For example, a transaction re-ordering situation that may result in inconsistent data accesses is a read transaction that requests "pre-fetching" of contents of a block of address locations. If a write transaction is allowed to "pass" the read request, then the actual read access will retrieve data having a value indicative of the results of the write request. Another situation where it is necessary to maintain the order of read requests to avoid inconsistent data accesses involves requests directed to a similar address, e.g., the "head" of a first-in, first-out (FIFO) queue. The data "word" present at the head of the FIFO changes between an initial read request and a subsequent read request. Accordingly, if those requests are allowed to get "out of order", the result of the initial read request would be a subsequent data word rather than the intended initial data word.

In the case of a split transaction bus, such as the conventional peripheral computer interconnect bus or HyperTransport (HPT) bus, it is possible for transactions to be reordered due to the use of virtual channels and ordering rules defined for the bus. In particular, it is possible for a read request followed by a write request to the same address to appear "out of order" at their destination. For example, assume a target on the HPT bus includes a control status register (CSR) that contains status information for use by a source on the bus. Assume also that the source stores (via a write request) a particular value in the CSR and then subsequently retrieves (via a read request) the content of that CSR location to determine if it is appropriate to issue another transaction. An example of a typical instruction code sequence for this application is:

Write MACREG1<value>
    Read MACREG1
    If (bit 3=j) then . . .
    Write MACREG1<new value>

The first write instruction is directed to writing a register (MACREG1) with a particular value. The next instruction is directed to reading the value of that register to check status; e.g., if (bit 3=j) then, etc. Thereafter, a subsequent write instruction is executed to write a new value to the MACREG1 register. Because of the ordering rules on the HPT bus, it is indeterminate as to which operation will occur first. Specifically, the HPT ordering rules allow write requests (e.g., posted requests) to "pass" any other request (e.g., non-posted requests) thereby allowing the transactions to be reordered at a device (such as a repeater) on the HPT bus to avoid deadlock. Thus, it is possible for the subsequent write request to pass the pending read request. Clearly, this may be problematic.

A typical solution to this problem is to require completion of the read request before the write request is issued. That is, to ensure ordering between transactions that may be reordered, software (such as a HPT device driver executing on a processor) is configured to defer ("hold off") issuing the subsequent write request until the pending read request completes. However, this approach is inefficient and degrades performance of the system since the processor is likely to stall program execution until the read request completes. The present invention is directed to a technique that ensures ordering of transactions without adversely impacting system performance.

SUMMARY OF THE INVENTION

The present invention relates to an apparatus and technique for off-loading responsibility for maintaining order among requests directed to a same address on a split transaction bus from a processor to a split transaction bus controller of an intermediate network node or any general-purpose processor subsystem, thereby increasing the performance of the processor. To that end, the present invention comprises an ordering circuit that enables the controller to defer issuing a subsequent (write) request directed to an address on the bus until all previous read requests directed to the same address complete. By off-loading responsibility for maintaining order among requests from the processor to the controller, the invention enhances performance of the processor since the processor may proceed with program execution without having to stall to ensure such ordering. The ordering circuit maintains ordering in an efficient manner that is transparent to the processor.

Specifically, the ordering circuit checks each write request that is issued by the processor to the split transaction bus to determine if there is a read request directed to the same address currently in progress (i.e., outstanding) over that bus. The circuit includes a data structure (i.e., table) configured to track outstanding requests issued over the split transaction bus. If it is determined that the write request is directed to an address of an outstanding read request, a conflict detection circuit asserts a match bit corresponding to that outstanding read request. Notably, a match bit is asserted for each outstanding read request directed to the same address as the write request. Each write request and its associated set of match bits are loaded into a first-in first-out (FIFO) buffer adapted to store commands to be transmitted over the split transaction bus.

When a write request having any of its match bits set is at the "head" of the FIFO, it must wait until all previous read requests directed to the same address as the write request are completed before it can be sent over the bus. In other words, the read request corresponding to each asserted match bit must complete before the write request is sent over the bus. If additional read requests issued by the processor are directed to the same address, they must wait until the write request has been sent to the bus before they can be sent. In this case, the additional read requests may be loaded into the same FIFO as the write request. However, if additional read requests issued by the processor are directed to addresses different from that of the write request, they may be sent to the bus while the write request waits for the "conflicting" read requests to complete.

Advantageously, the present invention increases performance of the node by "holding off" a current write request only as long as is necessary. That is, rather than holding off the write request in the presence of any pending read requests, including those requests directed to different addresses, the present invention holds off the write request only until completion of those read requests that have the same, conflicting addresses.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
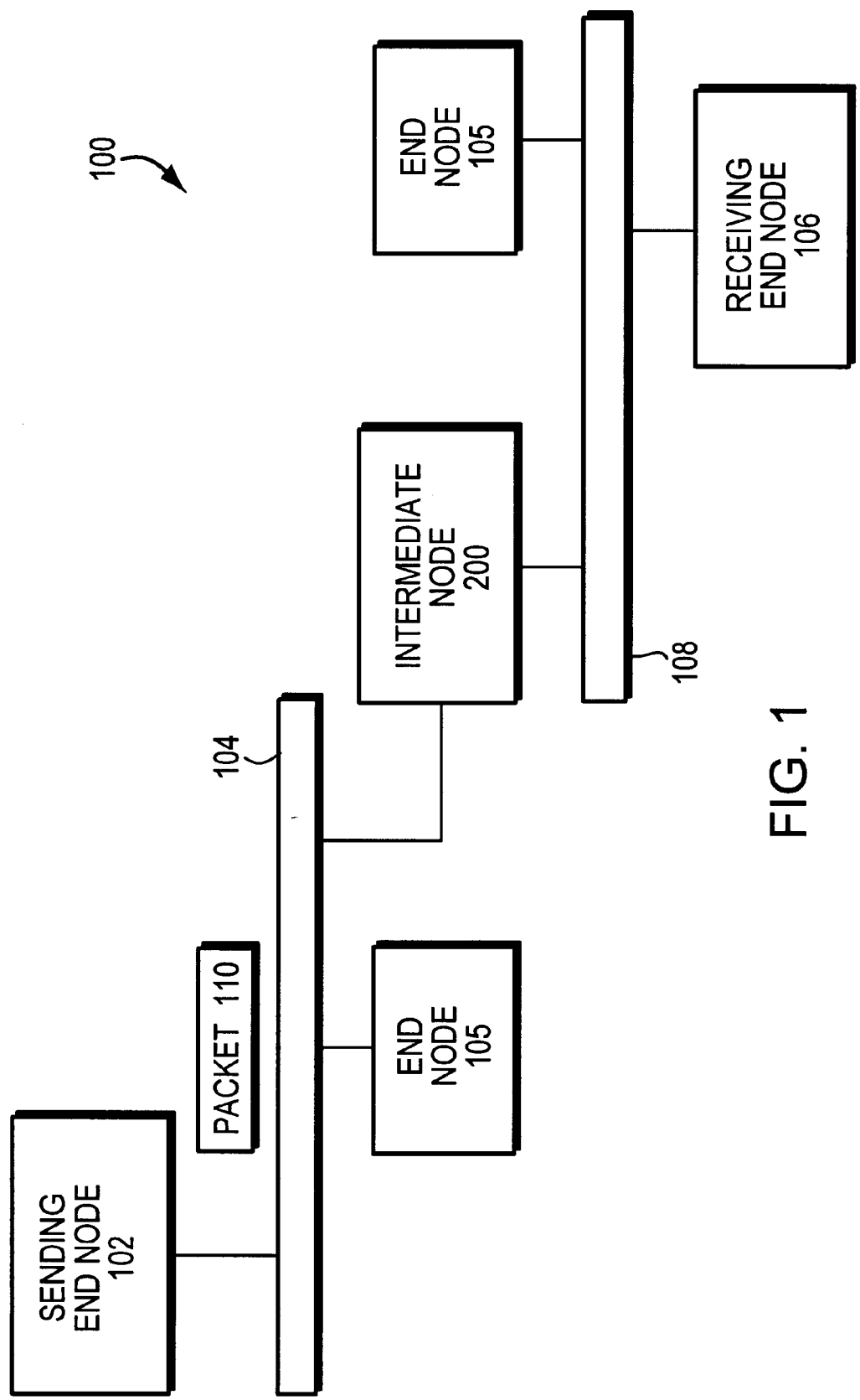
FIG. 1 is a block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 105, such as a sending end node 102 and a receiving end node 106, and an intermediate network node 200, the latter of which may be a switch or router. The subnetworks 104, 108 included within network 100 are preferably local area networks (LANs) interconnected by the intermediate node 200, although the networks may comprise other communication links, such as wide area networks. Communication among the nodes coupled to the LANs is typically effected by exchanging discrete packets 110 among the nodes.

For example, the sending node 102 generates a data packet 110 by encapsulating "payload" data within headers, such as conventional data link and network layer headers, as the data passes through different layers of a protocol stack. The packet is then transmitted over the network to the intermediate node 200 which facilitates the flow of the data packet through the network by routing it to the proper receiving node 106. Specifically, the node 200 receives the packet from an input port, parses the data link and network layer headers, renders a forwarding decision for the packet, appends a new data link header to the packet and then transmits the packet to an output port.

Figure 2:
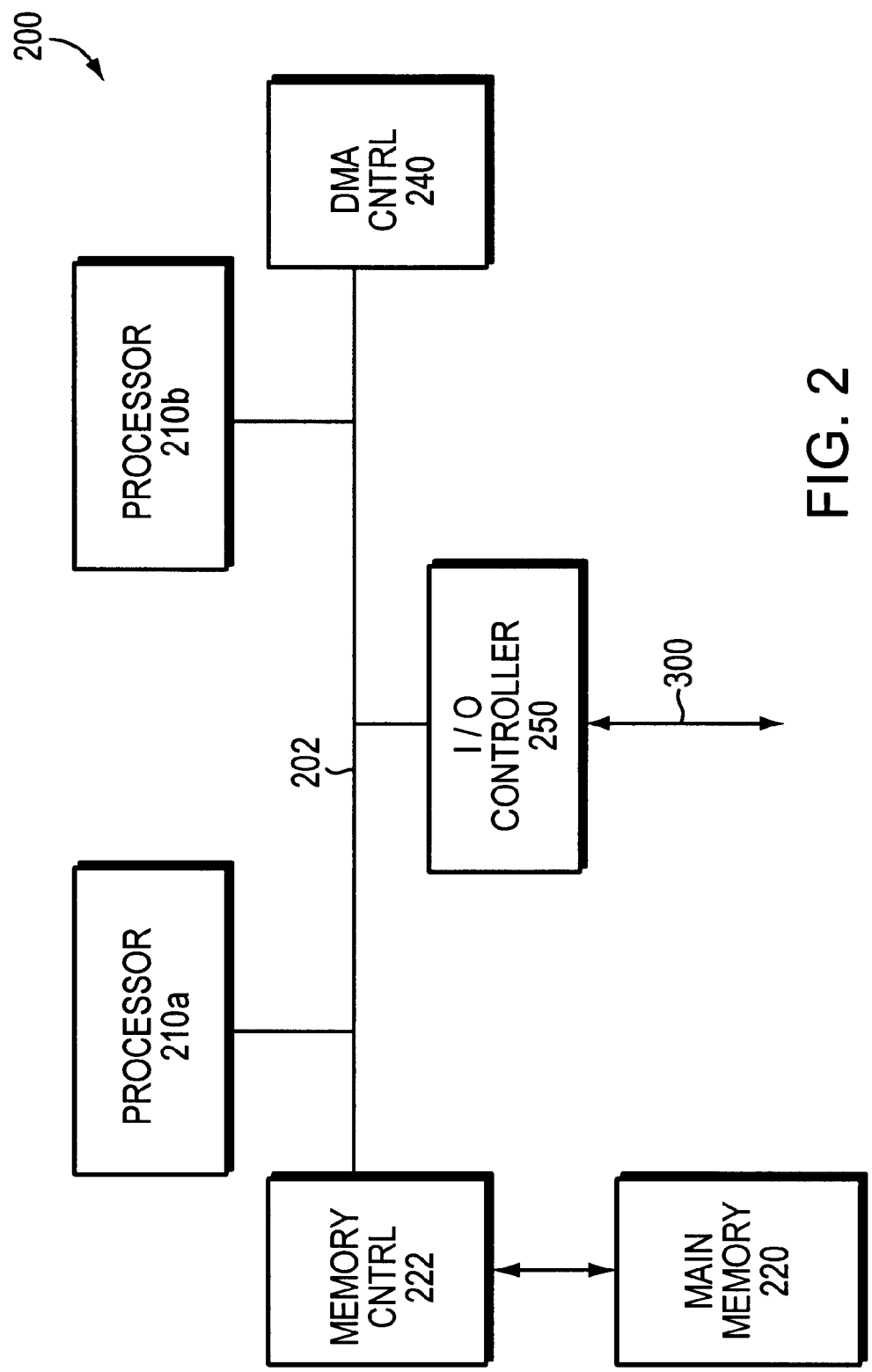
FIG. 2 is a schematic block diagram of an illustrative intermediate network node that may be advantageously used with the present invention.

FIG. 2 is a schematic block diagram of an illustrative intermediate network node 200 embodied as a dual-processor integrated circuit ("chip") with conventional external functions integrated within the chip. The dual-processor chip preferably includes two (2) processors 210a,b (e.g., MIPS processor cores) coupled to an input/output (I/O) bus controller 250 via a system bus 202. A memory controller 222 couples a main memory array 220, e.g., a synchronous dynamic random access memory (SDRAM) array, to the system bus 202. The main memory 220 comprises storage locations addressable by the processors for storing software programs and data structures associated with the invention described herein. An operating system, portions of which are typically resident in memory and executed by the processors, functionally organizes the intermediate node by, inter alia, invoking network operations in support of software processes executing on the node.

It will be apparent to those skilled in the art that other memory means, including various computer readable media, may be used for storing and executing program instructions pertaining to the described mechanism and technique.

A direct memory access (DMA) controller 240 performs DMA operations between the main memory 220 and the I/O controller 250. The I/O controller 250 is an integral part of an I/O system containing input and output ports through which the intermediate node physically connects to the LAN or other interconnects, such as an external I/O bus 300. The I/O bus, in turn, may be coupled to external I/O devices, such as bridges, repeaters or peripheral devices (e.g., a system disk). The external I/O bus 300 may comprise a conventional peripheral computer interconnect (PCI) bus coupled to PCI devices or a conventional HyperTransport (HPT) bus coupled to HPT devices. The present invention illustratively relates to the ordering of read and write transactions over an external I/O bus 300, such as the HPT bus, but may also apply to the ordering of transactions over the PCI bus or any other similar split-transaction bus that supports the ordering rules described herein. In particular, the ordering circuit described herein resides within the I/O controller 250, such as an HPT bus controller.

Figure 3:
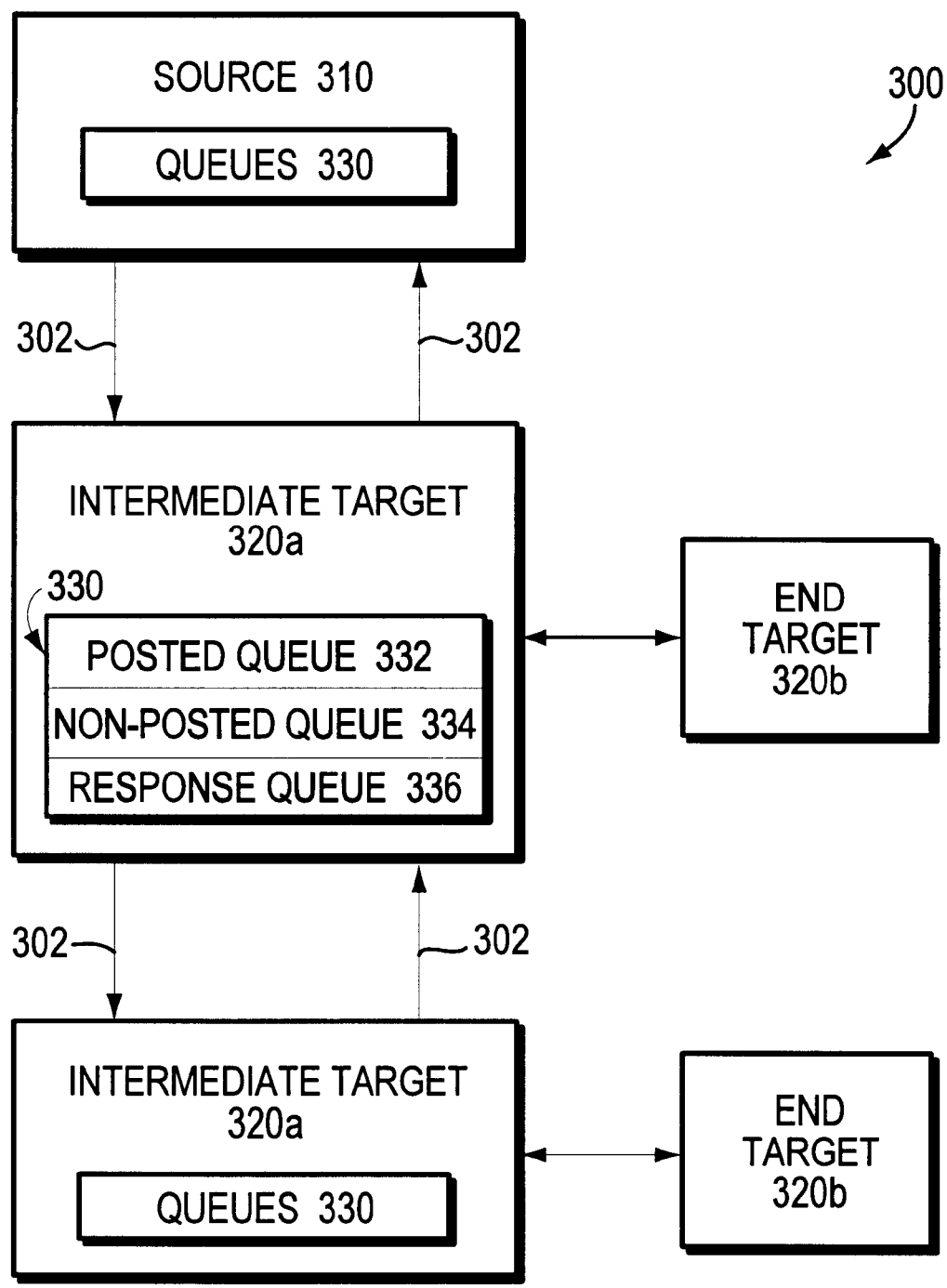
FIG. 3 is a schematic block diagram depicting the topology of a conventional external input/output (I/O) bus that may be advantageously used with the present invention.

FIG. 3 is a schematic block diagram depicting the topology of a conventional I/O bus 300, such as the HPT bus, including a source device 310 (e.g., the processor or I/O controller) connected to a plurality of intermediate target devices 320a (e.g., an HPT repeater) and end target devices 320b (e.g., an I/O device). The source 310 and targets 320 are interconnected via a plurality of unidirectional links 302 that cooperate to provide a high-speed transport.

Assume the source 310 issues a request for data, such as a read request, over the HPT bus to a target 320 coupled to that bus. Assume also that a period of time is necessary for the target to acquire the data requested by the source. Since the HPT bus is a split transaction bus, the source 310 relinquishes control over the bus once the request is sent. During the time the target 320 is processing the request, the source 310 may continue to issue other requests before it receives a response to the initial request. Upon acquiring the data requested in the initial request, the target 320 responds with a response packet that includes the data. The source essentially has ownership of the HPT bus transaction when issuing the request packet, while the target assumes ownership of the transaction when issuing the response packet to that request. Since the request is de-coupled in time from the response and the responses may arrive out of order, a transaction identifier is used with the HPT transaction to correlate the response with the request.

Each of the intermediate targets 320a (and source 310) includes buffers for storing transactions as they are received from the links 302. The buffers enable the devices to function as "store and forward" devices and, to that extent, provide opportunities for read/write requests to become out of order. For example, the HPT bus typically defines three buffers or first-in first-out (FIFO) queues 330 for storing various requests and response packets. A first FIFO queue 332 is designated for storing posted requests, i.e., requests for which there are typically no responses. An example of a posted request is a write request. A second FIFO queue 334 is a non-posted request queue used to store requests that require responses. Examples of a non-posted request are read requests, which typically require responses, and some write requests that may require responses. The present invention is primarily directed to write requests that are posted requests and read requests that are non-posted requests. A third FIFO queue 336 supported by the HPT bus specification is a response queue configured to store responses to the non-posted requests.

Each FIFO queue 330 is provided for each direction (i.e., for each unidirectional, point-to-point link) on the HPT bus. Furthermore, each queue may be defined as a virtual channel of the HPT specification. A set of rules governs the ordering of transactions (requests/responses) within the virtual channel queues in order to avoid deadlock over the HPT bus. These ordering rules are based on the availability of resources (posted, non-posted and/or response queues) within the HPT bus environment. As described herein, the HPT bus typically utilizes a credit-based flow control mechanism to provide "back pressure", on a "hop-by-hop" basis, in response to full utilization of resources within the devices.

Figure 4:
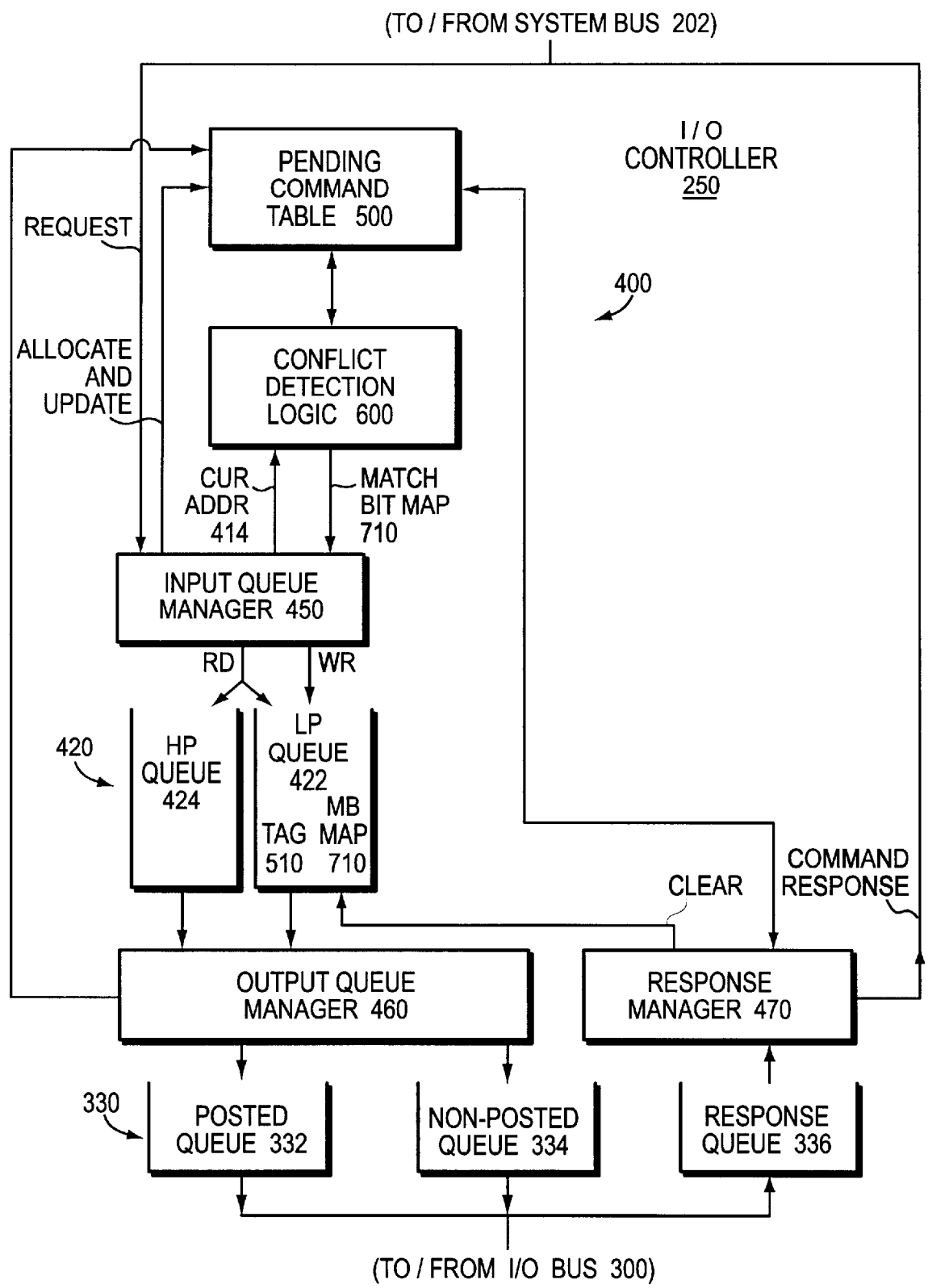
FIG. 4 is a schematic block diagram of a circuit embodied within a controller, such as an I/O controller, to ensure ordering of transactions over the I/O bus of FIG. 3.

FIG. 4 is a schematic block diagram of the ordering circuit 400 embodied within an I/O controller 250, such as the HPT bus controller, to ensure ordering of transactions over an external I/O bus 300, such as the HPT bus. The I/O controller 250 maintains a data structure that keeps track of the state of outstanding requests issued by the sources, such as processor 210 or the DMA controller 240. The data structure is preferably a state table, which is hereinafter referred to as a pending command table 500.

Figure 5:
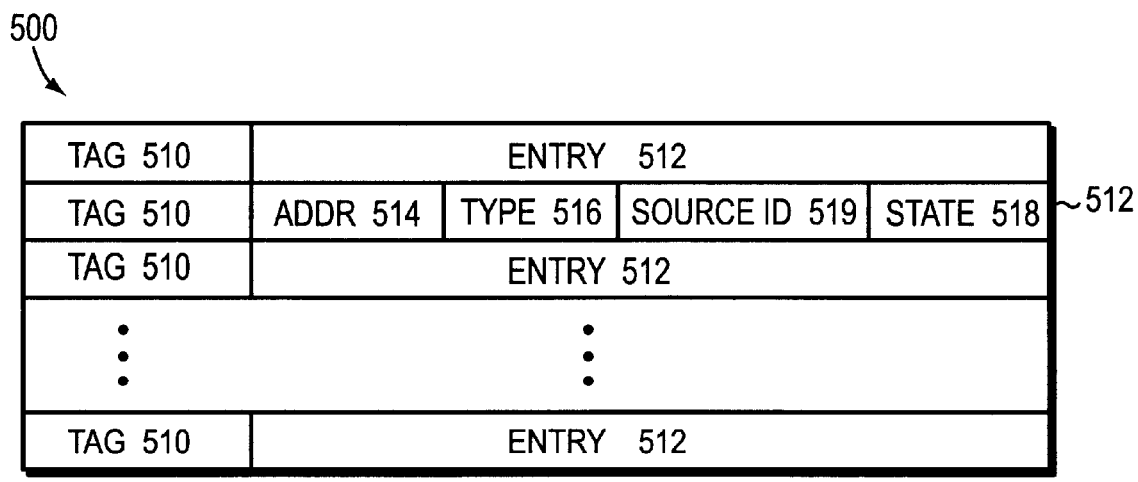
FIG. 5 is a schematic block diagram of a pending command table that may be advantageously used with the present invention.

FIG. 5 is a schematic block diagram of the pending command table 500 comprising a number of entries 512, each entry adapted to track a pending request issued by processor 210 or the DMA controller 240 and destined for the I/O bus 300. Each entry further includes a plurality of fields containing information pertaining to the pending (outstanding) request. For example, each entry 512 includes an address field 514 for storing a target (destination) address of the request, a type field 516 for storing a particular type (read or write) of the request, a source ID field 519 for storing the identity of the source of the request, and a state field 518 for storing a state (pending or non-pending) of the outstanding request. Associated with each entry 512 is a transaction identifier or a tag 510, such as an address or number of the entry in the table. In the illustrative embodiment, the tag 510 comprises four (4) bits for a total of sixteen (16) entries 512 in the table 500, although other embodiments, such as a 5-bit tag for a total of 32 table entries, may be used with the present invention.

The tag 510 associated with an outstanding request of a particular entry is included within a request packet transmitted over the I/O bus 300. The response to the request packet (i.e., the response packet) also includes the tag for purposes of correlating the response data to the request. Similarly, a write packet issued by the source includes a tag of an entry within the pending command table associated with that request. Write data destined for storage at a specified address location typically follows the write packet. The write packet generally requires no response; however in the event a response is required, the tag 510 associated with the write packet is contained in the response to correlate it to the original write request.

Specifically, a source, such as processor 210, issues read/write transactions (requests) over the system bus 202 to the I/O controller 250, where the requests are loaded into the pending command table 500. An available entry 512 of the table is allocated to that request upon reception of the request at the controller 250. The information associated with the request is stored in the allocated entry 512. At that time, the state 518 (status) of the request is denoted pending in the entry 512 and the request is queued for forwarding over the I/O bus 300 to the destination address.

For those requests that require a response, when the result of the request (e.g., the response) is returned to the controller it is eventually received by a response manager 470. The response manager 470 uses the tag in the response to locate the entry 512 in the pending command table corresponding to that response. Using the source ID field 519 of the entry 512 the response manager 470 identifies the source of the original request and forwards the data that was returned with the response to the source. The state of the entry 512 is then changed from pending to non-pending.

The I/O controller 250 also includes one or more priority buffers 420 organized as first-in, first-out (FIFO) queues used to store the read/write request packets destined for the I/O bus 300. In the illustrative embodiment, there are preferably two priority FIFO queues 420: a low priority (LP) FIFO queue 422 and a high priority (HP) FIFO queue 424. The use of two priority queues 420 enables the controller 250 to support out-of-order processing of transactions in accordance with an I/O (e.g., HPT) bus protocol. As noted, out-of-order processing is employed to avoid deadlock conditions on the I/O bus.

All write requests are preferably loaded into the low priority FIFO queue 422, whereas read requests may be loaded into either the low priority FIFO queue 422 or the high priority FIFO queue 424. As for the latter, a read request is always loaded into the high priority queue if there is no request directed to the same address of that read request currently loaded into the low priority FIFO queue 422 or there are no read requests in the low priority FIFO queue 422. If either of these conditions is true, the read request is loaded into the low priority FIFO queue 422. Preferably, the tags 510 associated with the pending command table entries, rather than the actual requests, are loaded into the FIFO queues 420.

As noted, each intermediate target 320a coupled to the I/O bus 300, including the I/O controller 250, contains queues 330 specified by the bus protocol. These queues include the posted request queue 332, the non-posted request queue 334 and the response queue 336. The I/O bus 300 further specifies a flow control mechanism to determine whether a next device 320 coupled to the bus has resources available to receive posted or non-posted requests from the controller 250. The flow control mechanism is invoked when resources within the devices coupled to the I/O bus are unavailable. As a result, the requests loaded into different queues 330 may become out of order.

For example, if the non-posted request queue 334 in the intermediate target 320a configured to store read requests becomes full, a device 320 may invoke flow control to suppress further issuance of those requests to that device. In that case, another request (such as a write request) loaded into the posted request queue 332 may be issued over the bus 300 prior to the pending read request in the non-posted queue 334 to thereby generate an out-of-order condition on the bus. This condition, which results in a write request "passing" a read request, typically arises to avoid deadlock on the I/O bus 300 and to enhance system throughput.

Assume that in the low priority queue 422, there are no requests to address A and no read requests pending. Further assume a read request directed to address A is issued by the processor 210 to the I/O controller 250 prior to a write request to the same address. Because there is no request to address A pending in the low priority queue 422 and there are no read requests in the low priority queue 422, the controller 250 loads the read request into the high priority queue 424 and then loads the subsequent write request into the low priority queue 422. The controller typically services the high priority queue 424 before servicing the low priority queue 422, if it is able to do so. The ability of the controller 250 to service its priority queues 420 is dependent on the status of the posted and non-posted request queues at the interface to the I/O bus 300.

Yet, even if the high priority (read) request is serviced before any low priority request, the I/O controller 250 cannot guarantee that a target 320 "downstream" on the I/O bus 300 will maintain that order. This is because the I/O bus ordering rules allow write requests (e.g., posted requests) to "pass" any other request (e.g., non-posted requests) thereby reordering transactions at a device (such as a repeater) on the bus to avoid deadlock. For example, if the non-posted request queue 334 of an adjacent downstream repeater is full, that repeater 320a invokes the flow control mechanism to prevent the I/O controller from sending the pending read request at the head of its non-posted request queue 334 over the bus 300. Similarly, another downstream device on the I/O bus may invoke flow control to prevent an adjacent upstream device from sending it a non-posted request. Invocation of flow control may lead to a subsequent write request passing the read request and, therefore, an ordering problem.

Prior solutions to the ordering problem require that the source, such as processor 210, wait until issuing a subsequent request if it needs to maintain ordering. In other words, since write requests can pass read requests, the processor must "hold off" issuing a subsequent write request until the response to a previous read request completes to thereby ensure ordering among those requests. Typically, software (e.g., a device driver) executing on the processor issues a read request and then waits until the response to that request completes before issuing a subsequent request. This results in a substantial performance penalty since the processor is essentially waiting (stalling) and not performing any useful function during this period of time.

The present invention is generally directed to an apparatus for off-loading responsibility for maintaining order among requests from the processor to the I/O controller, thereby increasing the performance of the processor. More specifically, the present invention is directed to a technique that enables the I/O controller to "hold off" a subsequent (write) request directed to an address until a previous (read) request directed to the same address completes. By off-loading responsibility for maintaining order among requests from the processor to the controller, the invention enhances performance of the processor since the processor may proceed with program execution without having to ensure ordering. The ordering circuit 400 described herein maintains such ordering in an efficient manner that is transparent to the processor.

Figure 6:
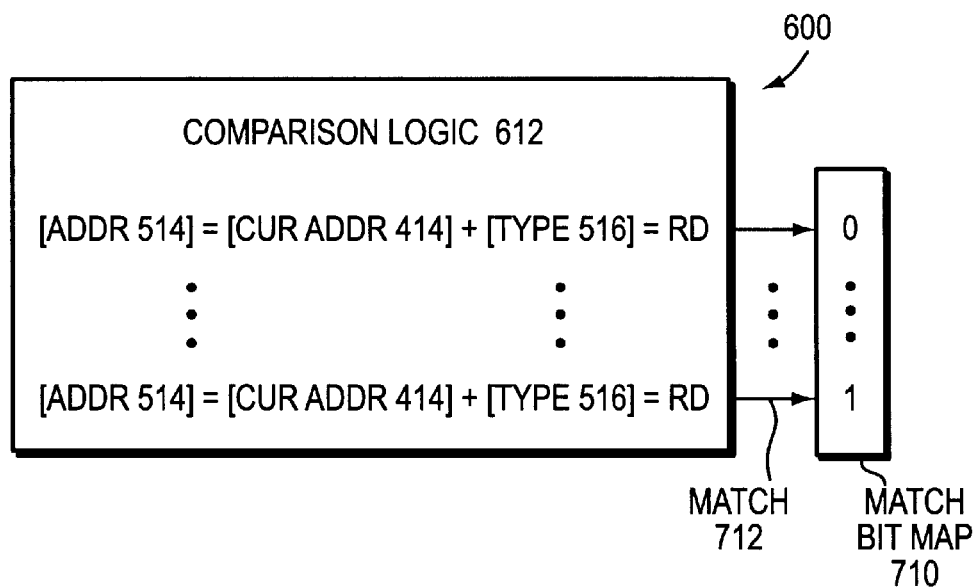
FIG. 6 is a functional block diagram of conflict detection logic in accordance with the present invention.

To that end, the circuit 400 further comprises conflict detection logic 600, a functional block diagram of which is shown in FIG. 6. The logic 600 comprises conventional circuitry configured to compare the address of a current write request (Cur Addr 414) received from processor 210 with the address of all pending read requests to ensure that the addresses are not the same. That is, prior to loading the current write request into, e.g., the low priority FIFO 422 of the controller 250, the address of that request is compared with the addresses of all pending read requests listed in the pending command table 500 to determine whether there is a match. If the address of the current write request matches an address of a pending read request, then a match bit 710 associated with the current request is asserted and loaded into the low priority FIFO 422 along with the request.

According to the invention, assertion of the match bit 710 denotes that there is a pending read request directed to the same address as the current write request.

In the illustrative embodiment, conventional comparison logic 612 preferably includes discrete comparator logic, each associated with an entry 512 of the pending command table 500 and configured to compare the address 514 of the request stored in that entry with the current address 414 to determine whether they are the same. In addition, logic 612 determines whether the type 516 of command pending in the entry 512 is a read (RD) request. A match bit 712 is asserted if the compared addresses are the same and the type of command associated with the pending entry is a read request. If the command loaded in the entry is not a pending read request, a match condition does not arise.

In response to the comparison operations, the conflict detection logic 600 generates a match bit map 710 having a plurality of match bits 712, each match bit corresponding to an entry 512 of the pending command table 500. Assertion of bits 712 within the match bit map 710 indicates those entries of the pending command table that are pending read requests whose addresses match the address specified by the current write request. For example, if entries 4 and 12 of the pending command table 500 contain pending read requests with addresses that match the current address 414, a match bit map 710 having asserted match bits 4 and 12 is generated by the conflict detection logic 600 and forwarded to an input queue manager 450.

The input queue manager 450 is configured to receive requests from the system bus 202, allocate an entry 512 of the pending command table 500 for each received request, calculate a tag value 510 that is associated with the allocated entry and update that entry with appropriate information. The appropriate information that is placed in the entry includes the address of the request, the type of the request and the state of the request. The tag value is calculated by setting the tag value to the address of the allocated entry.

In addition, the input queue manager 450 supplies the conflict detection logic with the current address (address of the request) 414. The conflict detection logic, in turn, calculates a match bit (MB) map 710 value based on the current address 414. The input queue manager 450 loads this match bit (MB) map 710 value along with the tag 510 of the current request when it loads the low priority queue with a write request.

Figure 7:
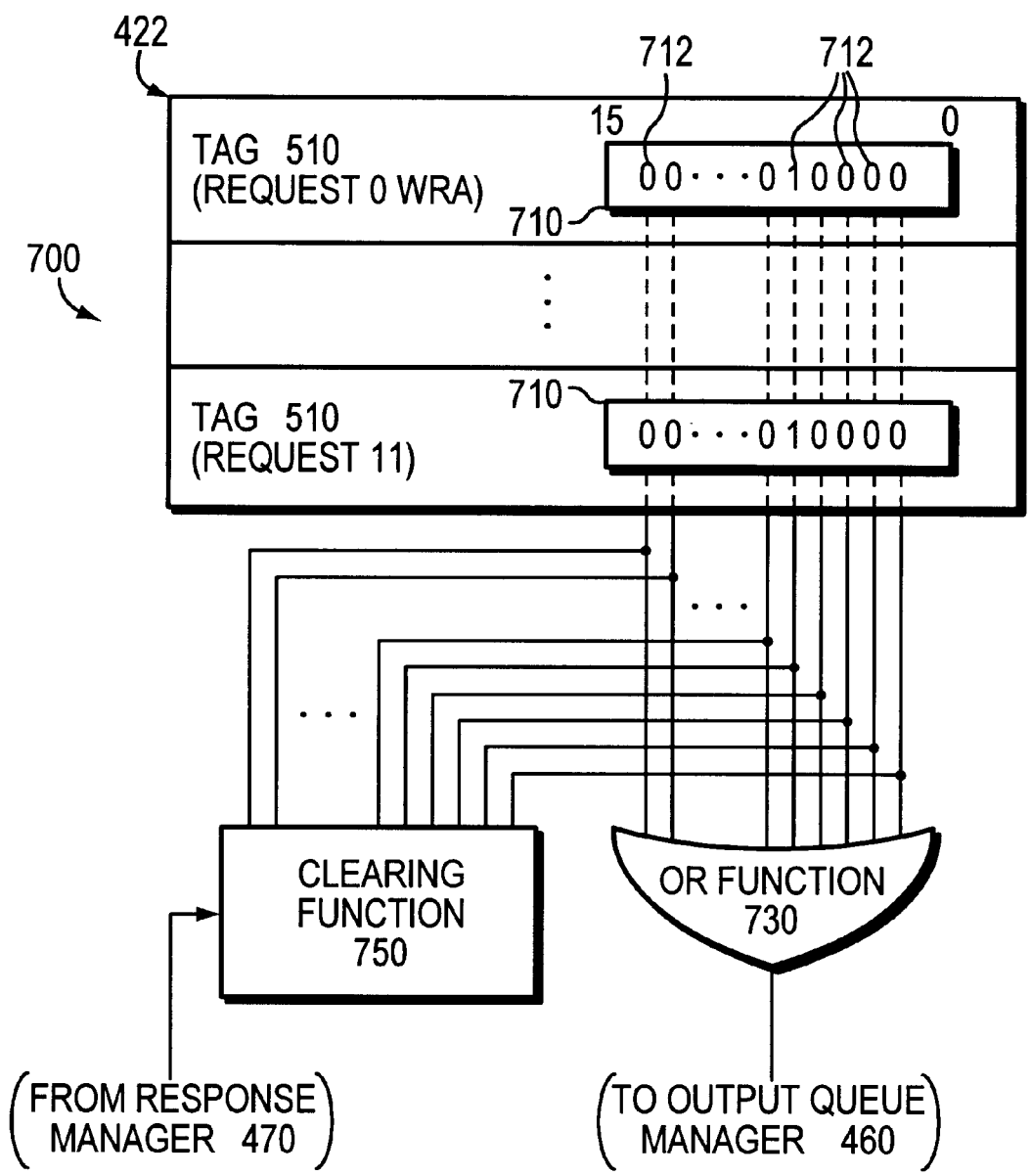
FIG. 7 is a schematic block diagram of logic circuitry associated with a low priority queue of the I/O controller of FIG. 4.

FIG. 7 is a schematic block diagram illustrating logic circuitry 700 associated with the low priority FIFO 422 and configured to operate with the match bit map 710 associated with each write request loaded into the FIFO. Assume the tag 510 associated with a current write request directed to address A (request 0, WRA) is loaded into the low priority FIFO 422. In addition, bit 4 of the match bit map 710 is asserted to denote a conflict with the address of a pending read request stored at entry 4 of the pending command table 500 because that request was issued prior to the current WRA request. Thus, request 0 WRA within FIFO 422 has an associated match bit map 710 with match bit 712 of position 4 asserted. There may be other entries 512 in the pending command table 500 that have a conflict with WRA and, in that case, those corresponding bits are also asserted.

Assume now that a read request to address A stored at entry 4 of the pending command table 500 is issued, followed by WRA and then a subsequent read request to address A stored at entry 12 of the pending command table 500. Here, only the bit 712 associated with entry 4 of the match bit map 710 is asserted because it was issued prior to the current write request WRA. Bit 712 associated with entry 12 of the match bit map 710 is not asserted because it was issued subsequent to the current write request and loaded "behind" it in the low priority FIFO 422.

Assume further that the current write request WRA propagates through the low priority FIFO queue 422 and eventually reaches the head of that FIFO. An output queue manager 460 then decides whether to send that request to the posted/non-posted request queues 330 at the interface to the I/O bus 300. That is, the output queue manager 460 determines from which priority FIFO queue 420 it will service (retrieve) pending requests for loading into the posted and non-posted request queues 330 at the interface to the I/O bus 300. The output queue manager 460 generally services the high priority FIFO 424 first (if possible) when loading the read requests into the non-posted request queue 334 of the I/O bus interface. The output queue manager may also, when appropriate, move a pending posted write request into the posted request queue 332 of the interface while substantially simultaneously moving a pending read request into the non-posted request queue 334. In the case of a posted write, the output queue manager 460 further marks the corresponding entry 512 in the pending command table 500 as non-pending since no response is expected.

If any of the bits 712 of the match bit map 710 associated with the write request WRA at the head of the low priority FIFO 422 are asserted, the output queue manager 460 does not send the WRA to the request queues 330 at the interface to the I/O bus 300 because the asserted bit denotes a potential conflict. Thus, in accordance with the present invention, the match bits 712 of the match bit map 710 are used to maintain order among read and write requests directed to the same address on the I/O bus. Here, a logical OR function 730 is performed on all of the bits 712 of the match bit map 710 at the head of the low priority FIFO 422. If any of the bits are asserted, the output queue manager 460 does not send the current write request WRA at the head of the low priority FIFO 422 to the I/O bus interface. Instead the output queue manager 460 continuously examines the output of the logical OR function 730 until it is zero. When the output of the logical OR function 730 is zero, indicating that all of the bits of the match bit map 710 have been cleared, the output queue manager forwards the request to the appropriate posted or non-posted request queue 330.

As each response to a conflicting read request is received at the I/O controller 250, its match bit 712 corresponding to the current write request WRA that is asserted in the low priority FIFO 422 is cleared. That is, as each response associated with a read request having an asserted match bit for the current write request is received at the I/O controller 250, the response manager 470 clears (turns off) its corresponding match bit 712 at the low priority FIFO. The response manager 470 uses the tag 510 contained in the response packet to identify the corresponding match bit to clear when the response is received. The response manager 470 also uses the tag 510 to retrieve the entry 512 from the pending command table 500 and extract the source ID from field 519. The source ID is used to forward the data associated with the response over the system bus 202 to the appropriate source of the original request.

Often, the corresponding match bit 712 may need to be cleared in multiple entries of the low priority FIFO. For example, assume another request stored in the low priority FIFO (denoted request 11) has bit 4 of the match bit map 700 asserted. When a response to a pending read request is received at the I/O controller 250, the response manager 470 not only clears its corresponding bit at the current write request (request 0 WRA) but also clears a corresponding match bit 710 at request 11 of the low priority FIFO 422. According to an aspect of the invention, the response manager initiates a "clear-the-column" clearing function 750 on the low priority FIFO 422 to clear the corresponding bit 712 of the match bit map 710 at all entries of the FIFO. Clearing of the asserted bit 712 within the match bit map 710 occurs whenever the response associated with the corresponding read request is received at the I/O controller. That is, an asserted bit of the match bit map can be cleared prior to the entry of the low priority FIFO reaching the head of the queue. This aspect of the invention advantageously enables all bits that may have been asserted within the match bit map 710 associated with a write request to be cleared prior to the write request reaching the head of the low priority FIFO 422. The current write request is thus not delayed at the head and may be issued immediately to the posted or non-posted request queue 330 to the I/O bus interface.

In the illustrative embodiment, the low priority FIFO 422, the logical OR function 730 and the clearing function 750 may be implemented using discrete logic. For example, each entry of the FIFO may be implemented using a register and the clearing function may be implemented using discrete logic configured to clear each position of the bit map or vector. Moreover, the input queue manager 450, the output queue manager 460 and response manager 470 may comprise conventional logic circuitry used to allocate and update entries of the data structures described herein, as well as buffers and transceiver circuitry to receive and output values for those entries. These managers are preferably implemented in hardware, although it should be understood that the methods pertaining to the present invention may alternatively be implemented through software techniques and structures.

While there has been shown and described an illustrative embodiment for offloading responsibility for maintaining order among requests directed to a same address on a split transaction I/O bus from a processor to an I/O controller, it is to be understood that various other adaptations and modifications may be made within the spirit and scope of the invention. For example, in an alternate embodiment, only a single priority queue 420 (as opposed to two priority FIFO queues 422, 424) may be used with the present invention. Although the single queue implementation obviates the possibility of conflicting read requests "getting ahead" of a current request, this implementation is not considered a high-performance solution since the output queue manager 460 can only service one request at a time.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An ordering circuit configured to off-load responsibility for maintaining order among read and write requests directed to a same address on a split transaction bus from a processor to a split transaction bus controller of an intermediate network node, the ordering circuit comprising:

a command table having a plurality of entries, each entry tracking a pending request issued by the processor and destined for the split transaction bus;

a match bit map having a plurality of match bits, each match bit corresponding to an entry of the command table; and conflict detection logic coupled to the command table, the conflict detection logic comparing an address of a write request issued by the processor with an address of a pending read request stored in each entry of the command table, the conflict detection logic asserting the match bit corresponding to an entry of the command table when the address of a pending read request stored in the entry matches the address of the write request, wherein assertion of a match bit causes the write request to wait until the pending read request corresponding to the asserted match bit completes before being sent over the split transaction bus to thereby maintain order among read and write requests directed to the same address on the bus.

2. The ordering circuit of claim 1 wherein each entry of the command table comprises:

an address field for storing the address of the request;

a type field for storing a particular type of request; and a state field for storing a state of the request.

3. The ordering circuit of claim 2 wherein each entry of the command table further comprises:

a source ID field for storing the identity of the source of the request.

4. The ordering circuit of claim 1 further comprising:

an input queue manager coupled between a system bus and the command table, the input queue manager receiving a request from the system bus and, in response, allocating an entry in the command table, the input queue manager further calculating a tag value associated with the allocated entry, and placing the type of request and address of the request in the allocated entry.

5. The ordering circuit of claim 4 wherein the input queue manager is further coupled to the conflict detection logic and a low priority FIFO, the input queue manager sending the address of the request to the conflict detection logic and, in response, receiving a match bit map from the conflict detection logic, the input queue manager loading the received match bit map and the tag value into an entry in the low priority FIFO.

6. The ordering circuit of claim 5 further comprising:

a response manager coupled to the low priority FIFO and a response queue, the response manager receiving a response associated with the pending read request from the response queue and deasserting an asserted match bit corresponding to the pending read request for each entry in the low priority FIFO.

7. The ordering circuit of claim 1 wherein the conflict detection logic comprises:

comparator logic associated with each entry of the command table and configured to compare the address of the request stored in the command table entry with the address associated with the request.

8. The ordering circuit of claim 7 wherein the match bit is asserted if the compared addresses are the same and the type of command in the entry is a read request.

9. The ordering circuit of claim 5 further comprising:

an output queue manager coupled to a high priority FIFO and the low priority FIFO, the output queue manager servicing a request at the high priority FIFO before servicing a request at the low priority FIFO.

10. A method for maintaining order among read and write requests directed to a same address on a split transaction bus from a processor to a split transaction bus controller of an intermediate network node, the method comprising the steps of:

receiving a request at an ordering circuit of the controller, the request containing a type of the request and an address of the request;

storing the request into an entry in a command table and marking the request as pending;

if the type of the request is a write request, searching the command table and asserting a match bit for each pending read request entry whose request address stored in the entry matches the address of the write request;

loading the request in an output queue;

when the request reaches a head of the output queue, determining if match bit is asserted in any entry associated with the request;

if any match bit is asserted, causing the request to wait at the head of the output queue until all match bits are clear; and as each pending read request completes, marking the entry for the read request as non-pending and clearing the match bit associated with the read request for all entries in the table.

11. The method of claim 10 wherein the step of loading the request in an output queue further comprises:

if the request is a write request, loading the request in a low priority output queue; and if the request is a read request, loading the request in a high priority output queue unless the low priority queue contains either a read request or another request whose request address is the same as the request.

12. Apparatus for maintaining order among read and write requests directed to a same address on a split transaction bus from a processor to a split transaction bus controller of an intermediate network node, the apparatus comprising:

means for receiving a request at an ordering circuit of the controller, the request containing a type of the request and an address of the request;

means for storing the request into an entry in a command table and marking the request as pending;

if the type of the request is a write request, means for searching the command table and asserting a match bit for each pending read request entry whose request address stored in the entry matches the address of the write request;

means for queuing the request on an output queue;

when the request reaches a head of the output queue, means for determining if match bit is asserted in any entry associated with the request;

if any match bit is asserted, means for stalling the request at the head of the output queue until all match bits are clear; and as each pending read request completes, means for marking the entry for the read request as non-pending and clearing the match bit associated with the read request for all entries in the table.

13. A computer readable medium containing executable program instructions for maintaining order among read and write requests directed to a same address on a split transaction bus from a processor to a split transaction bus controller of an intermediate network node, the executable program instructions comprising program instructions for:

means for receiving a request at an ordering circuit of the controller, the request containing a type of the request and an address of the request;

storing the request into an entry in a command table and marking the request as pending;

if the type of the request is a write request, searching the command table and asserting a match bit for each pending read request entry whose request address stored in the entry matches the address of the write request;

queuing the request on an output queue;

when the request reaches a head of the output queue, determining if match bit is asserted in any entry associated with the request;

if any match bit is asserted, stalling the request at the head of the output queue until all match bits are clear; and as each pending read request completes, marking the entry for the read request as non-pending and clearing the match bit associated with the read request for all entries in the table.

14. A method in a network intermediate node for maintaining order among read and write requests directed to a same address on a split transaction bus, comprising:

receiving a request containing a type of the request and an address of the request, the type indicating a read request or a write request;

storing the request into an entry in a command table in the controller;

searching, in response to the type of the request being a write request, the command table and asserting a match bit for each pending read request entry whose request address stored in the entry matches the address of the write request;

loading the write request in an output queue;

determining, in response to the write request reaching a head of the output queue, if a match bit is asserted in any entry having the address of the write request;

enabling, in response to any match bit being asserted, the write request to wait at the head of the output queue until all match bits for the address of the write request are clear; and as each pending read request completes, clearing the match bit associated with the read request; and executing the write request when all match bits are cleared.

15. The method of claim 14, further comprising:

placing a subsequent read request to the same address as the pending write request into the same FIFO as the pending write request so that the subsequent read request executes after the pending write request.

16. The method of claim 14, further comprising:

maintaining a high priority FIFO and a low priority FIFO;

placing a new read request with no pending write request for the same address into the high priority FIFO;

placing a new write request in the low priority FIFO so that pending read requests for the same address will execute more quickly in the high priority FIFO, in order to minimize any waiting of the write request.

17. The method of claim 16 further comprising:

servicing a request in the high priority FIFO before servicing a request in the low priority FIFO.

18. Apparatus in a network intermediate node for maintaining order among read and write requests directed to a same address on a split transaction bus, comprising:

means for receiving a request containing a type of the request and an address of the request, the type indicating a read request or a write request;

means for storing the request into an entry in a command table in the controller;

means for searching, in response to the type of the request being a write request, the command table and asserting a match bit for each pending read request entry whose request address stored in the entry matches the address of the write request;

means for loading the write request in an output queue;

means for determining, in response to the write request reaching a head of the output queue, if a match bit is asserted in any entry having the address of the write request;

means for enabling, in response to any match bit being asserted, the write request to wait at the head of the output queue until all match bits for the address of the write request are clear; and as each pending read request completes, means for clearing the match bit associated with the read request; and means for executing the write request when all match bits are cleared.

19. The apparatus of claim 18, further comprising:

means for placing a subsequent read request to the same address as the pending write request into the same FIFO as the pending write request so that the subsequent read request executes after the pending write request.

20. The apparatus of claim 18, further comprising:

means for maintaining a high priority FIFO and a low priority FIFO;

means for placing a new read request with no pending write request for the same address into the high priority FIFO;

means for placing a new write request in the low priority FIFO so that pending read requests for the same address will execute more quickly in the high priority FIFO, in order to minimize any waiting of the write request.

21. The apparatus of claim 20 further comprising:

means for servicing a request in the high priority FIFO before servicing a request in the low priority FIFO.

22. An ordering circuit configured to off-load responsibility for maintaining order among read and write requests directed to a same address on a split transaction bus from a processor to a split transaction bus controller of an intermediate network node, the ordering circuit comprising:

a command table having a plurality of entries, each entry tracking a pending request issued by the processor and destined for the split transaction bus;

a match bit map having a plurality of match bits, each match bit corresponding to an entry of the command table; and conflict detection logic coupled to the command table, the conflict detection logic comparing an address of a write request issued by the processor with an address of a pending read request stored in each entry of the command table, the conflict detection logic asserting the match bit corresponding to an entry of the command table when the address of a pending read request stored in the entry matches the address of the write request, logic circuitry, in response to assertion of a match bit, to enable the write request to wait until the pending read request corresponding to the asserted match bit completes before being sent over the split transaction bus to thereby maintain order among read and write requests directed to the same address on the bus.

23. The ordering circuit of claim 22, further comprising:

the conflict detection logic having comparator logic associated with each entry of the command table and configured to compare the address of the requests stored in the command table entry with the address associated with a write request; and logic circuitry to assert the match bit in response to the address of the write request matches the address of the entry, and the entry is a read request.

24. The ordering circuit of claim 22 wherein each entry of the command table comprises:

an address field for storing the address of the request;

a type field for storing a particular type of request;

a state field for storing a state of the request; and a source ID field for storing the identity of the source of the request.

25. The ordering circuit of claim 22 further comprising:

an input queue manager, the input queue manager receiving a request from the system bus and, in response, allocating an entry in the command table, the input queue manager further calculating a tag value associated with the allocated entry, and placing the type of request and address of the request in the allocated entry;

a low priority FIFO, and the input queue manager coupled to the conflict detection logic and the low priority FIFO, the input queue manager sending the address of a read request to the conflict detection logic and, in response to receiving a match bit map from the conflict detection logic indicating a pending write request, the input queue manager loading the received read request and the match bit map and the tag value into an entry in the low priority FIFO;

a high priority FIFO, the input queue loading a read request into the high priority FIFO in response to the conflict detection logic not receiving a match with a pending write request.

26. The ordering circuit of claim 22 further comprising:

a response manager coupled to the low priority FIFO and a response queue, the response manager receiving a response associated with the pending read request from the response queue, the response indicating that the pending read request has completed, and the response manager deasserting an asserted match bit corresponding to the pending read request; and logic circuitry to execute the write request in response to all matching bits indicating pending read requests for the address of the write request are deasserted.

* * * * *

UNITED STATES PATENT AND TRADEMARK OFFICE
CERTIFICATE OF CORRECTION

PATENT NO. : 6,832,279 B1
DATED : December 14, 2005
INVENTOR(S) : Kenneth H. Potter et al.

It is certified that error appears in the above-identified patent and that said Letters Patent is hereby corrected as shown below:

Title page,
Item [73], Assignee, delete "Cisco Systems, Inc." and replace with
-- Cisco Technology, Inc. --.

Signed and Sealed this

Sixth Day of September, 2005

JON W. DUDAS
*Director of the United States Patent and Trademark Office*